(12) United States Patent
Raber et al.

(10) Patent No.: US 8,733,525 B2
(45) Date of Patent: May 27, 2014

(54) ADJUSTING DEVICE

(71) Applicant: Schaeffler Technologies AG & Co. KG, Herzogenaurach (DE)

(72) Inventors: Christoph Raber, Ottweiler-Steinbach (DE); Christian Asal, Schoenau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/896,790

(22) Filed: May 17, 2013

(65) Prior Publication Data

US 2013/0248318 A1 Sep. 26, 2013

Related U.S. Application Data

(63) Continuation of application No. PCT/DE2011/001938, filed on Nov. 7, 2011.

(30) Foreign Application Priority Data

Nov. 19, 2010 (DE) .......................... 10 2010 052021
Aug. 24, 2011 (DE) .......................... 10 2011 081475
Aug. 24, 2011 (DE) .......................... 10 2011 081476

(51) Int. Cl.
*F16D 13/75* (2006.01)

(52) U.S. Cl.
USPC ............... 192/70.252; 192/111.16; 192/111.2

(58) Field of Classification Search
USPC ............... 192/111.15, 111.17, 111.18, 111.2, 192/111.3, 111.4, 111.5
See application file for complete search history.

(56) References Cited

U.S. PATENT DOCUMENTS

| 3,841,454 | A | * | 10/1974 | Pionte ..................... 192/111.15 |
| 4,228,883 | A | | 10/1980 | Palmer |
| 5,513,736 | A | * | 5/1996 | Mizukami ................ 192/70.252 |
| 5,904,233 | A | * | 5/1999 | Hashimoto ................ 192/111.2 |
| 7,178,649 | B2 | * | 2/2007 | McCutcheon ............ 192/111.2 |
| 2004/0055847 | A1 | * | 3/2004 | Hirschmann et al. ...... 192/70.25 |

FOREIGN PATENT DOCUMENTS

| DE | 102005058844 | 7/2006 |
| DE | 102011102307 | 12/2011 |
| EP | 0769632 | 4/1997 |

* cited by examiner

*Primary Examiner* — Rodney Bonck
(74) *Attorney, Agent, or Firm* — Simpson & Simpson, PLLC

(57) ABSTRACT

The present invention relates to an adjusting device for a friction clutch of a motor vehicle, having a spindle, a spindle nut screwed onto the spindle to carry along an adjusting element to adjust a wear-related incorrect gap between a counter plate and a pressure plate for pressing a clutch plate between the pressure plate and the counter plate, and an essentially frictionally engaged and/or essentially stepless means of swiveling for swiveling the spindle to adjust the wear-related incorrect gap, as well as to a friction clutch having such an adjusting device.

9 Claims, 7 Drawing Sheets

ADJUSTING DEVICE

CROSS-REFERENCE TO RELATED APPLICATIONS

This application is filed under 35 U.S.C. §120 and §365(c) as a continuation of International Patent Application No. PCT/DE2011/001938 filed Nov. 7, 2011, which application claims priority from German Patent Application No. 10 2010 052 021.7, filed Nov. 19, 2010, and German Patent Application No. 10 2011 081 476.0, filed Aug. 24, 2011, and German Patent Application No. 10 2011 081 475.2, filed Aug. 24, 2011, which applications are incorporated herein in their entireties.

FIELD OF THE INVENTION

The invention relates to an adjusting device for a friction clutch of a motor vehicle, with the aid of which a wear-related incorrect gap between a pressure plate and a counter plate of the friction clutch can be adjusted.

BACKGROUND OF THE INVENTION

Friction clutches can be provided with a power-controlled adjusting device to compensate for wear that occurs in friction linings. Here, an unfavorable wear-induced development of the clamping force of an actuating system operating on a counter plate of the friction clutch to move the pressure plate, for example a diaphragm spring, is detected, and an adjustment is made depending on the clamping force. Alternatively, an incorrect gap occurring between the clutch housing and the actuating system in connection with wear to the friction linings of the clutch plate can be ascertained ("sensed"), and corrected depending on the incorrect gap. To make the correction here, compensatory means situated between the counter plate and the actuating system, such as ramp systems or threading, are twisted.

A path-controlled adjusting device is known from EP 0 769 632 A2, in which a drive pawl of a sensing plate that moves axially with a diaphragm spring and a pressure plate, depending on the distance of an actuating system, acts on a pinion of an axially movable spindle, while a spindle nut held on the spindle pre-tensions a spring when the spindle is rotated, whereby, upon disengagement of the clutch, due to the axial displacement of the spindle, the spring twists a ramp ring of a ramp system situated between the pressure plate and the diaphragm spring relative to an opposing ramp of the pressure plate, thus restoring the original distance of the actuating system from the pressure plate. As this occurs, during the raising of a counter plate relative to the pressure plate, the drive pawl slides on the teeth of the pinion, and when a predefined wear has occurred, meshes with a gap between two teeth. The drive pawl carries the pinion with it by positive engagement, and at the same time rotates the pinion and hence the spindle, whereby the spindle nut is moved along the spindle and rotates the ramp ring by a corresponding angular amount, in order to thereby adjust the friction clutch. An additional locking plate engages with the pinion to prevent the pinion from turning back due to friction after an adjustment of the friction clutch.

There is a danger that the pawls engaging with the pinion may be damaged, which could impair the adjusting function of the adjusting device.

BRIEF SUMMARY OF THE INVENTION

The object of the invention is to create a robust adjusting device for a friction clutch, in particular a double plate clutch, of a motor vehicle.

The adjusting device according to the invention for a friction clutch of a motor vehicle is equipped with a spindle, a spindle nut screwed onto the spindle to carry along an adjusting element to adjust a wear-related incorrect gap between a counter plate and a pressure plate for pressing a clutch plate between the pressure plate and the counter plate, and an essentially frictionally engaged and/or essentially stepless swiveling means for swiveling the spindle to adjust the wear-related incorrect gap.

Preferably, a drum to drive the spindle is connected to the spindle, a means of swiveling in the form of a sling rope being wrapped around the drum. The sling rope is connected at a first end to a first spring element.

With the aid of the sling rope, the spindle can be swiveled or twisted, without a drive pawl being necessary, thus reducing the danger of impairment of the adjustment function by bent or kinked parts. This makes the adjusting device more robust. Furthermore, the swiveling or twisting is performed by the sling rope by non-positive engagement, in particular by frictional engagement, and at the same time stepless, since the drum is not designed as a drive pinion, and thus has no tooth structure which must be engaged by the nonexistent drive pawl to twist it.

At the same time, a length equalization can be effected by the first spring element, and the operative rope force can be increased when the spindle turns, so that slipping of the sling rope when wear is registered is prevented. In particular, it is possible, for example by increasing the self-retention of the spindle when wear is registered, to provide elevated restoring torque which is so high that as the spring force of the first spring element decreases, the friction between the spring rope and the drum can be overcome, so that the sling rope is able to slip on the drum. That makes it possible to save a locking plate that engages with a pinion, and the pinion itself, which simplifies the design of the adjusting device and makes it more robust. In particular, a separate counter-rotation device can be saved. Since pawls that move relative to the spindle, whose kinematics change over the life of the adjusting device, are avoided, the adjusting device can also be employed for especially large adjustment distances. For dual plate or multiple plate clutches, the adjusting device can preferably be provided with two or more clutch plates to be pressed together.

The cross section of the sling rope can be flat, rectangular, square, triangular or trapezoidal. The geometry of the drum is matched in particular to the cross section of the rope. To this end, the drum may have, for example, a helical receiving groove running in a circumferential direction to receive the sling rope. In particular, the receiving groove corresponds essentially to the cross section of the sling rope. That enables the sling rope to also fit closely to the drum laterally and to provide correspondingly greater friction. The angle of wrap of the sling rope on the drum can thereby be kept small, so that the sling rope can be designed correspondingly short. The first spring element can be designed as a compression or tension spring. The sling rope may be designed, for example, with both ends connected to a clutch cover of the friction clutch or to the pressure plate, the first end being joined only indirectly through the first spring element. A twisting of the spindle may be triggered in particular by the spindle being moved relative to the attachment of the sling rope when wear is registered, so that because of the movement of the spindle relative to the sling rope the sling rope causes the spindle to turn due to the frictional engagement with the drum.

Preferably, a second spring element that is stretchable from the spindle nut is provided, to transmit an adjustment force from the spindle nut to the adjusting element. The second spring element makes it possible to temporarily store the adjustment path to be applied to the adjusting element, for example a ramp ring of a ramp system. As a result, when the clutch is actuated with the aid of an actuating element, for example a diaphragm spring, the force provided by the actuating element can be utilized in order to be able to rotate the spindle of the adjusting device. At the same time, it is not necessary to move the adjusting element which is clamped between the pressure plate and the actuating element when the clutch is engaged. Instead, it is possible to wait until the clutch is disengaged and the adjusting element is no longer clamped between the pressure plate and the actuating element. In this case, the spring force of the tensioned second spring element is sufficient to move the adjusting element to compensate for a wear-related increased actuation travel for the actuating element. Until the friction forces acting on the adjusting element can be surmounted by the spring force of the tensioned second spring element, the spring force of the tensioned second spring element operating between the adjusting element and the spindle nut results in increased self-arresting of the spindle, so that at the beginning of the opening motion of the friction clutch the spring rope can be drawn relatively past the drum with the aid of the first spring element, so that the sling rope can be moved back into the starting position without turning the spindle back. For the function of temporarily storing the adjustment travel, the second spring element can be attached on one side with the spindle nut or with the adjusting element possibly attached through an interposed lug. The second spring element may be designed, for example, as a leaf spring, a diaphragm spring or a coil spring.

The adjusting element can be in particular part of a ramp system. The ramp system may be formed in particular by a ramp ring sliding on an opposing ramp. The adjusting device can act on the ramp ring or on the opposing ramp so as to rotate the ramp ring in a circumferential direction relative to the opposing ramp. It is also possible for the ramp system to have a plurality of ramps, distributed in a circumferential direction. The ramp and the opposing ramp may also be part of a threaded connection, so that the ramp ring can slide on the opposing ramp in one or more courses of the threaded connection.

In particular, the spindle may be swiveled around a pivotal axis which runs eccentrically to the center axis of the spindle. The pivotal axis may preferably run essentially parallel to the center axis of the spindle. The eccentric swiveling of the spindle moves the spindle on a circular path when wear is registered. In this movement, the spindle carries the sling rope lying on the drum with it, whereby the first spring element is deflected and supplies an increased rope force. This enables the sling rope to rotate the drum without slipping on the drum. The drum rotates the spindle, whereby the spindle screw is moved axially on the spindle.

By particular preference, the spindle is supported in a rocker that is rotatably connected to a retainer, where the rocker is in particular rotatable via a projecting extension from an actuating element to press the pressure plate, the drum being rotatable by the swiveling of the rocker. If the wear of the friction linings of the clutch plate is too severe, the actuating element may experience such long travel that the actuating element strikes the rocker and rotates the spindle. This results in an automatic registering of wear. With the aid of the rocker, rotation of the drum can be achieved by the closely fitting sling rope, so that an adjustment to compensate for the wear-related incorrect gap between the actuating element and the pressure plate can be made automatically. In particular, at least one stop is provided to limit the angular position of the rocker when the pressure plate is lifted from the counter plate. An unnecessary reverse movement of the rocker, which could impair the desired engagement circumstances of the sling rope on the drum, is thereby prevented. By particular preference, it is possible to insert the spindle together with the spindle nut, the drum, and possibly the sling rope and/or the second spring element into the rocker as a combined module. To this end, the spindle can be hooked by its axial ends into the rocker and positioned, for example with the aid of a mounting bow. With the aid of the mounting bow, the spindle can be fastened frictionally into the rocker by clamping, the spindle in particular being rotatable relative to the mounting bow. It is not necessary to provide openings in the rocker to support the spindle. Furthermore, it is easily possible to disassemble the module with the spindle, for example in order to make repairs. In particular, that makes it possible to turn the spindle nut back easily by hand when making repairs, in order to be able to move the adjusting element more easily during a repair.

Preferably, the spring force and the pre-tensioning of the first spring element, as well as the spring force and the pre-tensioning of the second spring element, are chosen so that when the drum is rotated while pressing on the pressure plate the sling rope is frictionally joined to the drum, and when the pressure plate is lifted off the counter plate the sling rope slips on the drum. By selecting an appropriate spring stiffness and by pre-tensioning the spring elements, it is possible to enable a rotation of the spindle when wear is registered and to prevent unwanted turning back of the spindle. The spring force and the pre-tensioning of the spring elements are matched in particular to the frictional circumstances between the sling rope and the drum, so that the coefficients of friction between the sling rope and the drum can also be taken into account.

In particular, the pre-tensioning of the first spring element is adjustable, in particular with the help of an adjusting screw. The pre-tensioning of the first spring element can thereby be matched to various construction types of friction clutches, in particular double plate clutches. In particular, the first spring element is designed as a leaf spring, which can be clamped against a structure by means of an adjusting screw so as to adjust the pre-tensioning.

Preferably, the spindle is received in a retainer in particular to attach it to a clutch cover, the first end of the spring rope being connected through the first spring element and the second end of the spring rope being connected directly to the retainer. The adjusting unit can thereby be fastened as a whole as a single module to a clutch cover, or to a component that is connected non-rotatably to the clutch cover. It is also possible to attach the adjusting device using a pressure plate. The retainer can be screwed on in particular by means of an elongated hole, so that to transport the friction clutch the adjusting device can be shifted in the longitudinal direction of the elongated hole in such a way that unintended adjusting of the friction clutch, for example due to vibration during transport, can be prevented. During assembly of the friction clutch, the adjusting device can be moved in the longitudinal direction of the elongated hole into the intended usage position and fixed, so that a force can be exerted on the adjusting device through the actuating element when wear is registered only after it has been moved from the transport position into the usage position.

The invention also relates to a friction clutch, in particular a double plate clutch, for a motor vehicle, having a counter plate and a pressure plate that is movable relative to the counter plate to press a clutch plate between the counter plate and the pressure plate. Also provided is a clutch cover to at least partially cover the pressure plate, and an adjusting device, in particular connected to the clutch cover, to adjust a wear-related incorrect gap between the pressure plate and the counter plate, where the adjusting device can be designed and refined as described above. With the aid of the sling rope, the spindle can be twisted, without a drive pawl being necessary, therefore reducing the danger of impairment of the adjustment function by bent or kinked parts. This makes the friction clutch more robust.

In particular, the adjusting device is situated radially outside of the pressure plate. That makes it possible to save axial construction space and/or to create construction space for a second clutch plate or additional clutch plates. In any event, the adjusting device projects, with a lug for actuating the adjusting element and/or a stop for the actuating element, into an area that lies in an axial extension of the pressure plate. In particular, the spindle and the drum are situated radially completely outside of the pressure plate.

Preferably, the adjusting device is connected through at least one elongated hole to the clutch cover or the pressure plate, while actuation of the adjusting device is disabled in a first end position of the elongated hole, and actuation of the adjusting device is enabled in a second end position of the elongated hole. The adjusting device can be screwed on in particular by means of the elongated hole, so that to transport the friction clutch the adjusting device can be shifted in the longitudinal direction of the elongated hole in such a way as to prevent any unintended adjustment of the friction clutch, for example due to vibration during transport. During assembly of the friction clutch, the adjusting device can be moved in the longitudinal direction of the elongated hole into the intended usage position and fixed, so that a force can be exerted on the adjusting device through the actuating element when wear is registered only after it has been moved from the transport position into the usage position. The at least one elongated hole can be provided in a retainer of the adjusting device and/or in a component, for example a clutch cover, to which the adjusting device can be screw-connected.

BRIEF DESCRIPTION OF THE SEVERAL VIEWS OF THE DRAWINGS

Examples of the invention will be explained below, referring to the accompanying drawings, on the basis of preferred exemplary embodiments. The figures show the following.

DETAILED DESCRIPTION OF THE INVENTION

Figure 1:
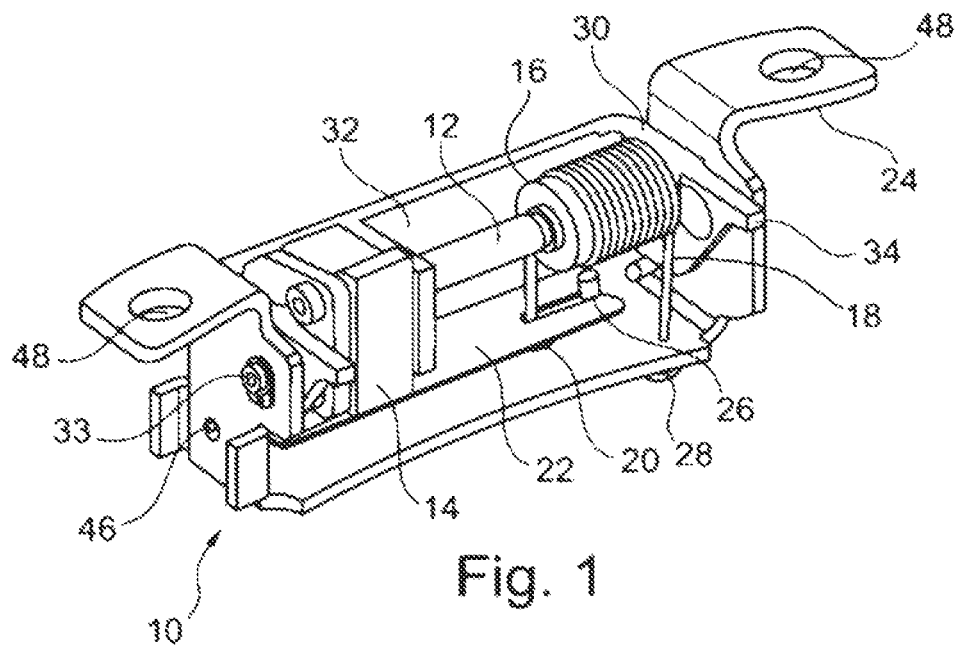
FIG. 1 is a schematic perspective view of an adjusting device.

The adjusting device 10 depicted in FIG. 1 has a spindle 12, onto which a spindle nut 14 is screwed. The spindle 12 can be driven by a drum 16, around which a means of swiveling is situated, in particular wound, in particular a sling rope 18, for completely or exclusively frictional and/or stepless wear adjustment. The sling rope 18 may be guided in a helical groove of the drum 16. A first end 20 of the sling rope 18 is connected to a first spring element 22 in the form of a leaf spring. The first spring element 22 is connected to a retainer 24, it being possible to set the pre-tensioning of the first spring element 22 using an adjusting screw 26 that is screwed into the retainer 24. The necessary holding force, so that the sling rope 18 does not slip on the drum 16, is produced by the pre-tensioned first spring element 22. A second end 28 of the sling rope 18 is connected directly to the retainer 24. The spindle 12 is inserted with the aid of a mounting bow 30 into a rocker 32, which is rotatably connected to the retainer 24. The rocker 32 is rotatably supported in the retainer 24 by means of holding pins 33. In the depicted exemplary embodiment, the rocker 32 has two projecting extensions 34, which may be struck by an actuating element 36 of a friction clutch 38 in the event of excessive wear of a clutch plate 40, in order to swivel the spindle by means of the rocker. During this swiveling, the sling rope 18 is able to rotate the drum 16 and with it the spindle 12, so that the spindle nut 14 can be moved axially along the spindle 12. As this occurs, the spindle nut 14 tensions a second spring element 42 in the form of a leaf spring, which is thereby able to apply a spring force to an adjusting element 44 in the form of a ramp ring. When the friction clutch 38 is disengaged, the self-arresting of the spindle 12 is so great due to the spring force of the second spring element 42 that the spring force of the deflected first spring element 22 is sufficient to let the sling rope 18 slip on the drum 16, so that unintended turning back of the drum 16 and the spindle 12 is prevented. The rocker 32 can then be moved back to the initial state, until the rocker 32 strikes a stop 46 and remains in a defined starting position. In the meantime, a force exerted by the actuating element 36 on the adjusting element 44 has clearly decreased, so that the spring force of the second spring element 42 is sufficient to deliver the adjustment path stored in the second spring element 22 to the adjusting element 44, and to compensate again for a wear-related enlarged actuation path of the actuating element 36 by means of a movement of the adjusting element 44. The maximum adjusting force needed to move the adjusting element 44 is smaller in this case than the minimum force of the second spring element 42. The adjusting device 10 can be connected to a clutch cover 50 or a pressure plate 52 by means of elongated holes 48 in the retainer 24.

Figure 2:
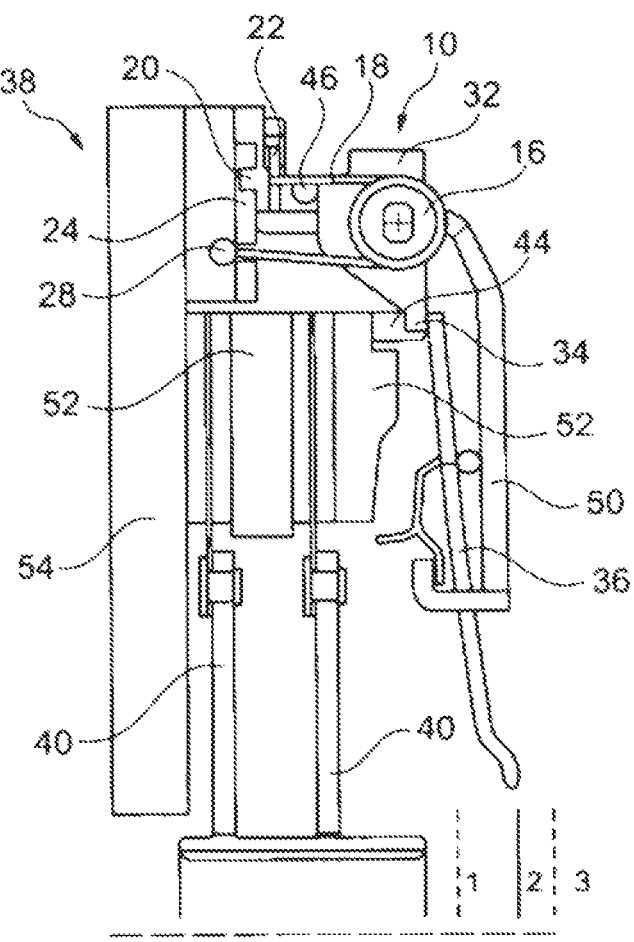
FIG. 2 is a schematic sectional view of a friction clutch in a first position.
Figure 3:
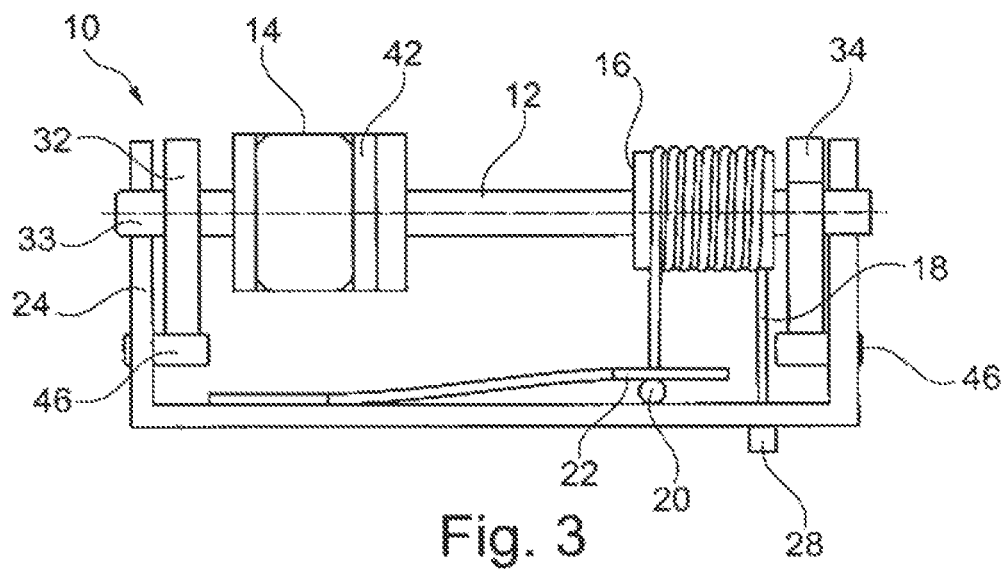
FIG. 3 is a schematic side view of the adjusting device of the friction clutch from FIG. 2.
Figure 4:
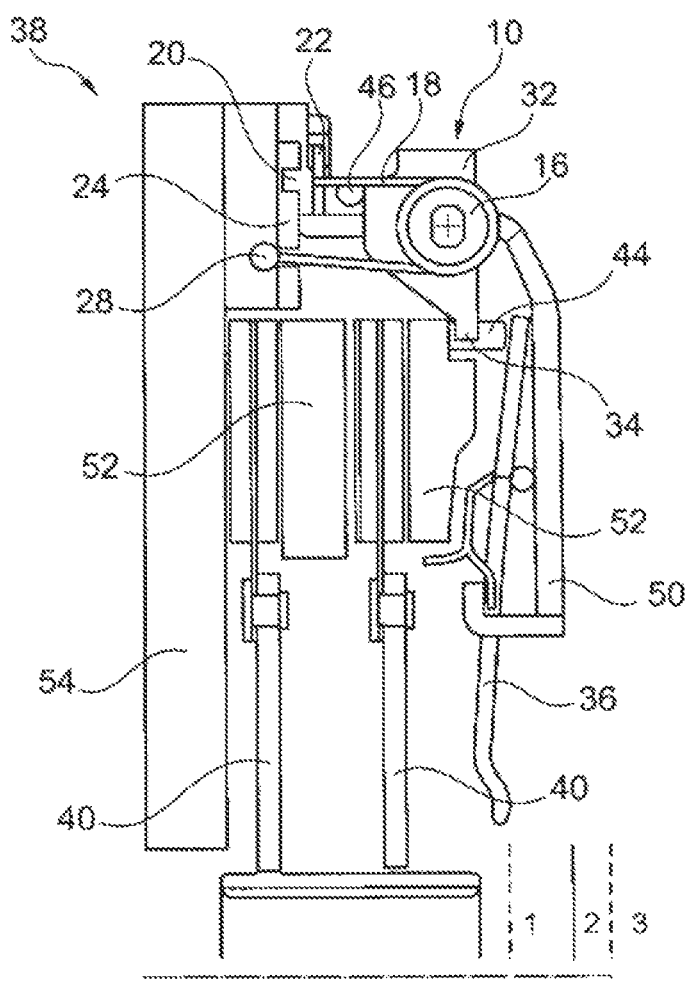
FIG. 4 is a schematic sectional view of the friction clutch in a second position.
Figure 9:
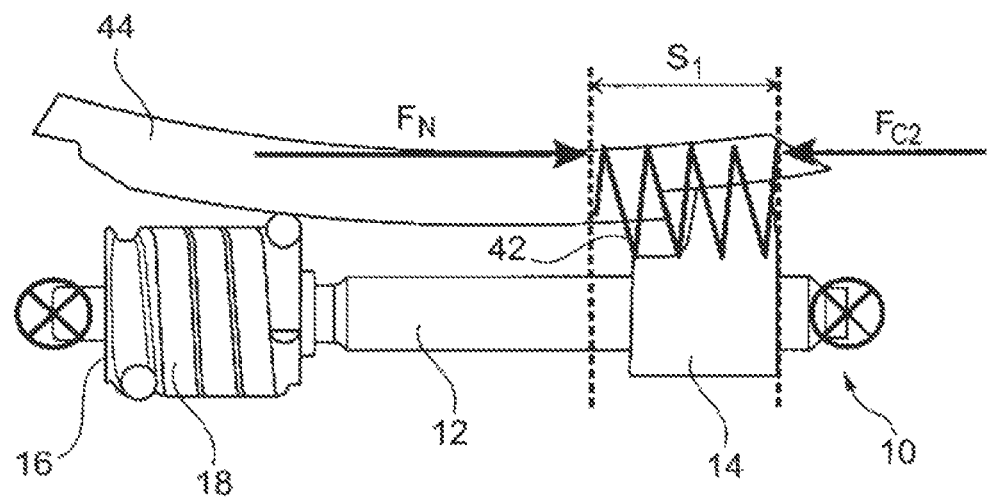
FIG. 9 is a schematic top view of the adjusting device of the friction clutch from FIG. 4.

If the friction clutch 38 is engaged and no wear is detected, as depicted in FIG. 2, the first spring element 22 holds the rocker 32 against the stop 46 because of the defined pre-tensioning of the first spring element 22. The second spring element 42 is pre-tensioned, and rests against the adjusting element 44. As shown in FIG. 3, in this state the first spring element 22 is not deflected. If the friction clutch 38 is disengaged, as shown in FIG. 4, the clutch plates 40 of the depicted double plate clutch separate. The pressure plates 52 and the adjusting element 44 move in the direction of the clutch cover 50. In this state, the deflected actuating element 36 is not resting against the extension 34 of the rocker 32. The position of the rocker 32 remains unchanged. In this state too, the first spring element 22 is not deflected. The second spring element 42 continues to be pre-tensioned and continues resting against the adjusting element 44, as shown in FIG. 9. In this state, the second spring element 42 has a spring length $S_1$ and a spring force $F_{C2}$, which is less than the blocking force $F_N$ of the firmly clamped adjusting element 44. The attainable pre-tensioning is designed so that it is greater than the maximum adjusting force. That ensures an adjustment when wear appears. An equilibrium of forces appears between the adjusting element 44 and the second spring element 42. The same applies if the coefficient of friction between the adjusting element 44, the pressure plate 52 and the actuating element 36 declines. If the friction clutch 38 is engaged, the pressure plates 52 for clamping the clutch plates 40 are moved toward a counter plate 54, so that the initial state depicted in FIG. 2 is restored.

Figure 5:
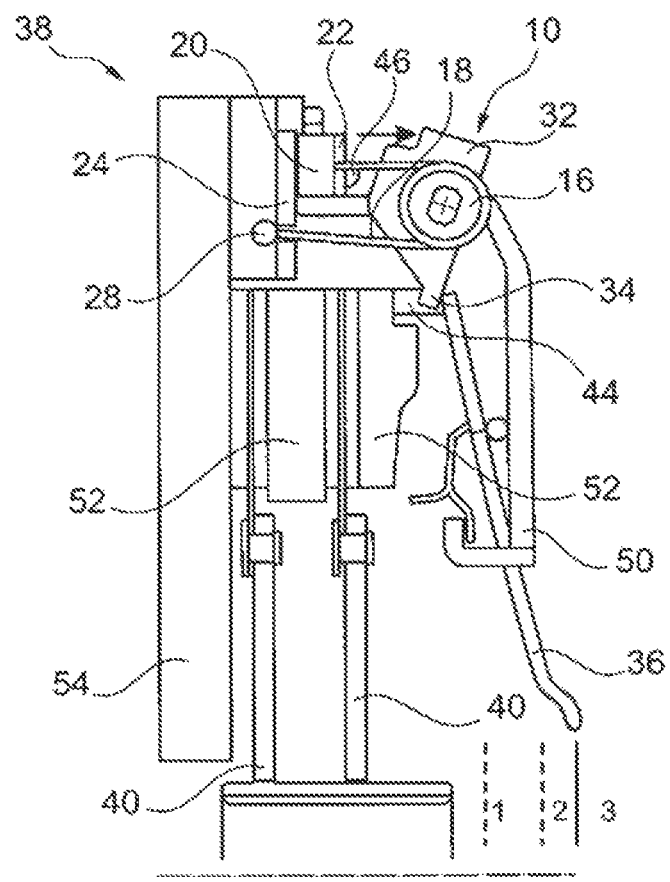
FIG. 5 is a schematic sectional view of the friction clutch in a third position.
Figure 6:
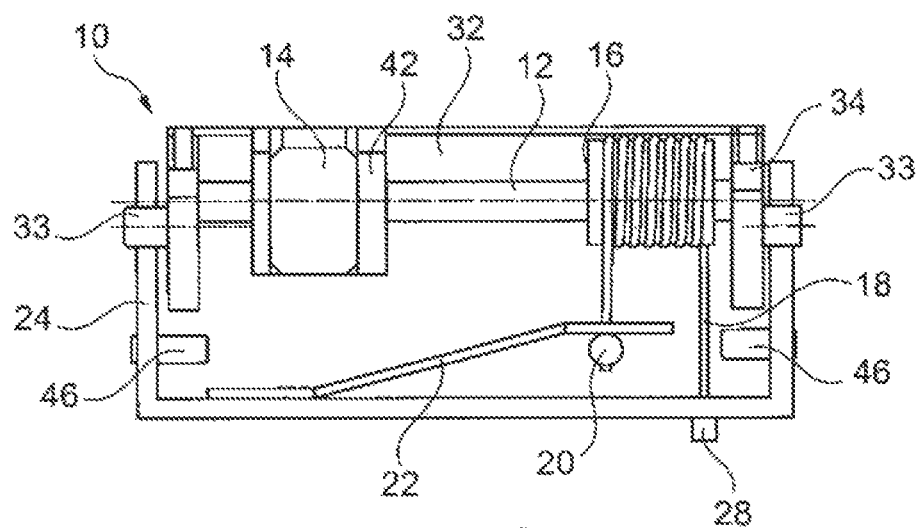
FIG. 6 is a schematic side view of the adjusting device of the friction clutch from FIG. 5.

If wear appears on the clutch linings of the clutch plates 40, the angular position of the actuating element 36 changes, as shown in FIG. 5. This change in the position of the actuating element 36 can be detected by the rocker 32, and the resulting deflection conveyed to the drum 16. The force to deflect the rocker 32 is supplied by the actuating element 36. By the fixing of the sling band 18 by means of the retainer 24 and the deflection of the rocker 32 by the detected wear, the drum 16 is turned. The turning motion of the drum 16 drives the spindle 12, which moves the spindle nut 14 by the adjustment distance. The second spring element 42 is thereby clamped between the spindle nut 42 and the adjusting element 44 jammed between the pressure plate 52 and the actuating element 36. Since this function is carried out with the friction clutch 38 in the engaged state, the adjusting element 44 cannot be driven by the great frictional force acting on the adjusting element 44. With the second spring element 42, the adjustment path can be stored, in order to drive the adjusting element 44 when the adjusting force (lifting) declines. The force of the sling band 18 and the resulting torque are greater than the frictional torque of the spindle 12. An additional consequence of the deflection of the rocker 32 is that the first spring element 22 is deflected and pre-tensioned, as shown in FIG. 6.

Figure 7:
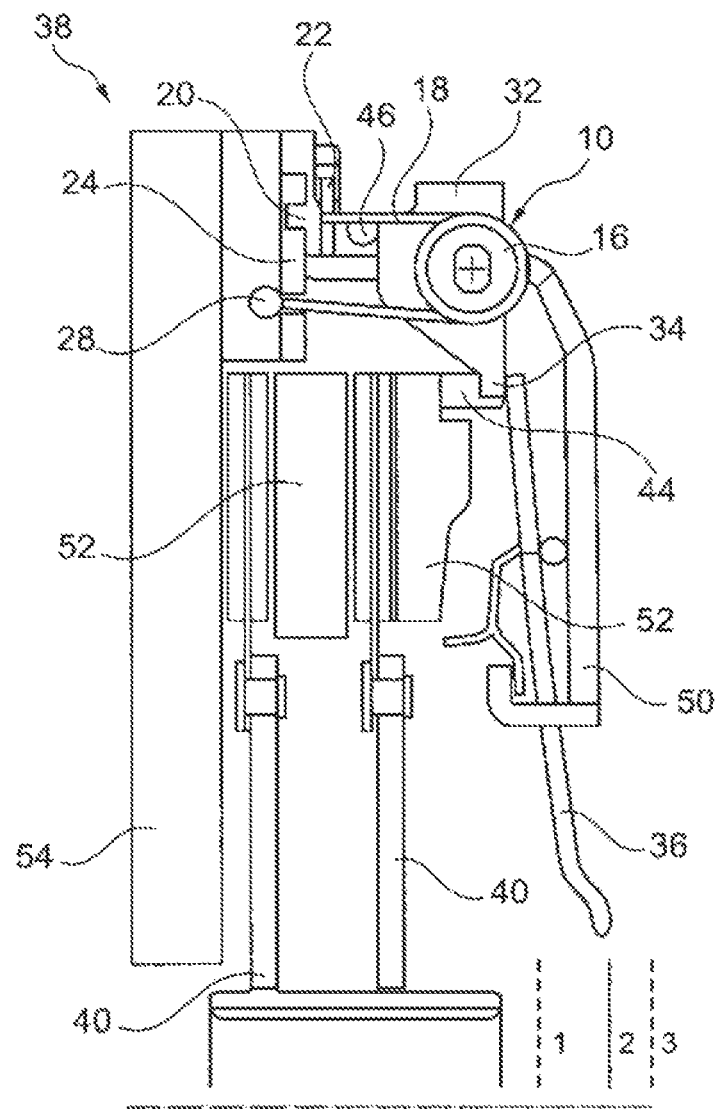
FIG. 7 is a schematic sectional view of the friction clutch in a fourth position.
Figure 8:
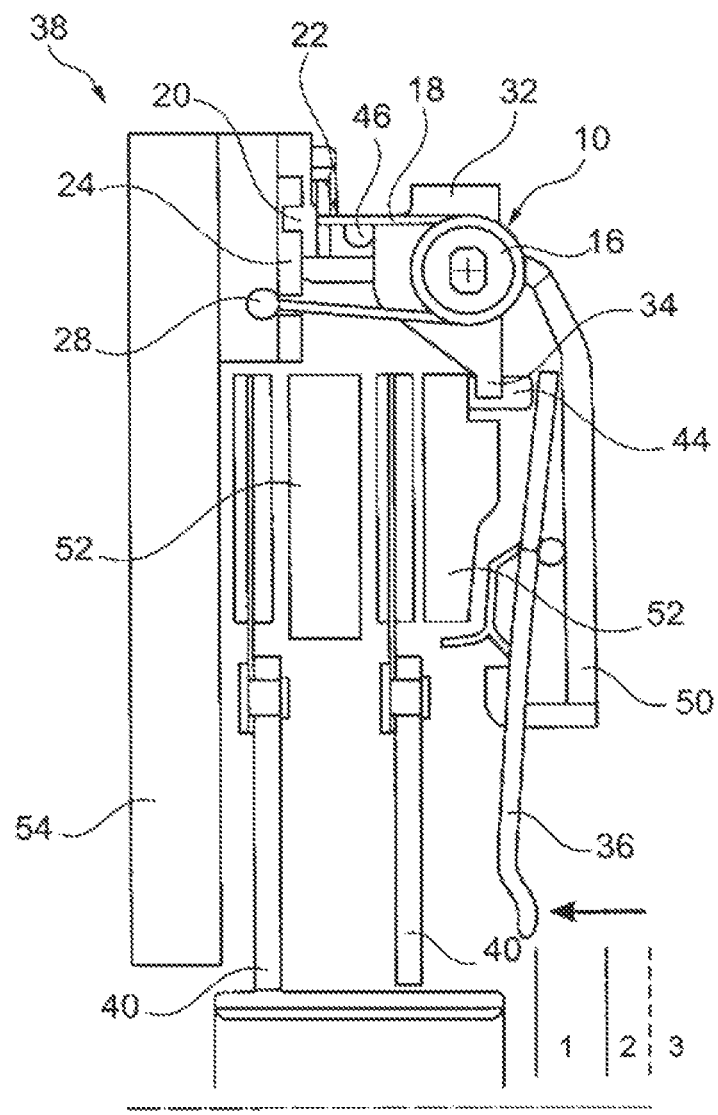
FIG. 8 is a schematic sectional view of the friction clutch in a fifth position.
Figure 10:
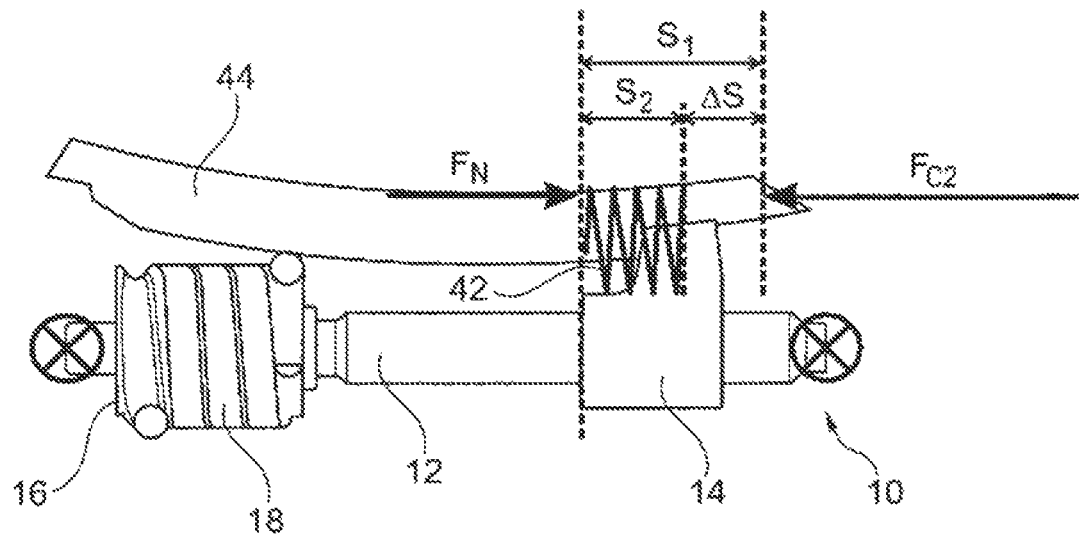
FIG. 10 is a schematic top view of the adjusting device of the friction clutch from FIG. 7.

The lifting motion of the pressure plate 52 in the event of wear can be divided into two sub-ranges. In the first sub-range, the friction clutch 38 is disengaged far enough so that the rocker 32 returns to its starting position, as in the state depicted in FIG. 7. The drum 16 and the spindle 12 do not rotate around their own axis in this case, since they are held by the frictional torque of the spindle 12 and are secured against rotating. During this process, a relative motion develops between the sling rope 18 and the drum 16, so that a state no longer exists in which the Euler-Eytelwein formula would apply. Thus the sling rope 18 also returns to the starting position. In the second sub-range of the lifting of the pressure plate 52 between the installation position of the actuating element 36 and the completely executed lifting of the actuating element, as shown in FIG. 8, the effective spring force of the first spring element 22 declines. As shown in FIG. 10, in this state the second spring element 42 now has a spring length of only $S_2$, which is smaller by a spring travel $\Delta S$ than the original spring length $S_1$. That has caused the spring force $F_{C2}$ of the second spring element 42 to increase, while due to the lifting motion of the pressure plate 52 the friction forces acting on the adjusting element 44 decrease, and the blocking force $F_N$ of the adjusting element 44 also drops. The spring force $F_{C2}$ of the second spring element 42 can thereby surmount the blocking force $F_N$ of the adjusting element 44 and move the adjusting element 44. As a result, a rotation of the adjusting element 44 can occur with the aid of the spring force of the second spring element 42, whereby the original position of the actuating element 36 can be restored, despite the occurrence of wear to the friction linings of the clutch plate 40. The difference in travel caused by the wear can be compensated for by ramps 60, 62 of the adjusting element 44 and the pressure plate 52 sliding on each other.

Figure 11:
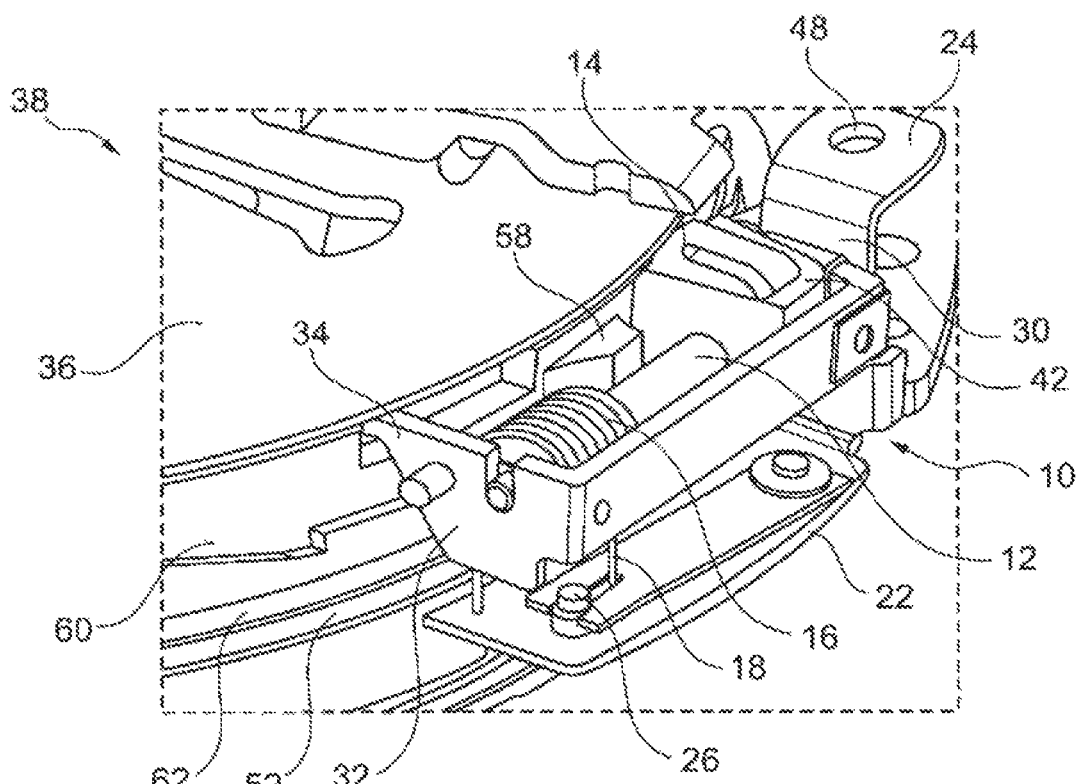
FIG. 11 is a schematic partially cutaway perspective view of the friction clutch, and, FIG. 12 is a schematic perspective view of the friction clutch from FIG. 11 with additional components installed.
Figure 12:
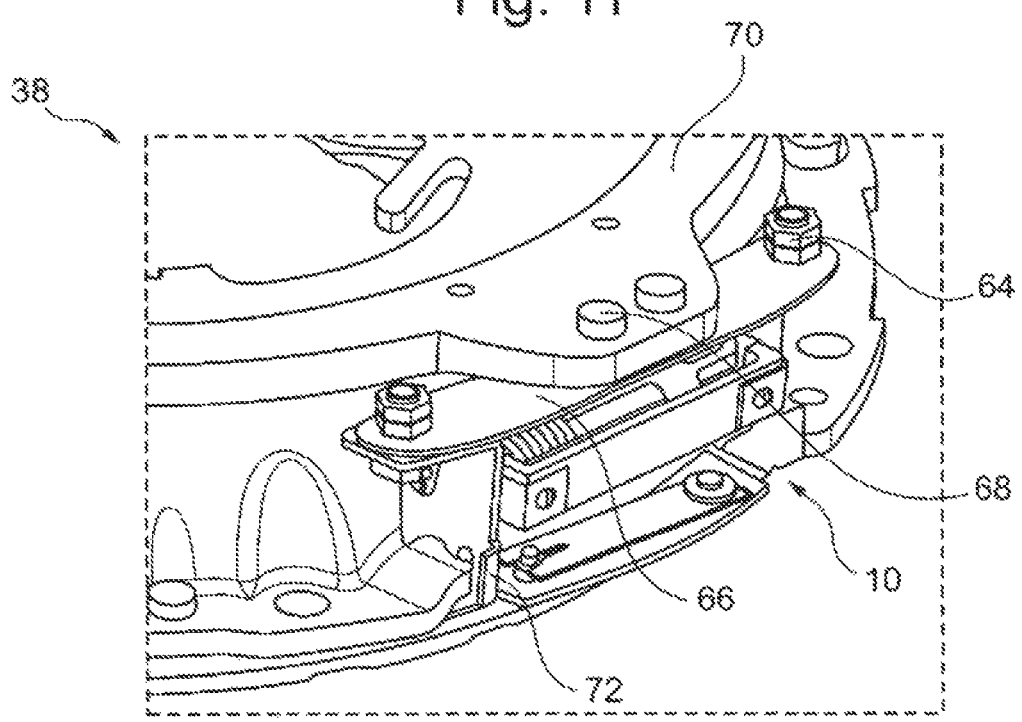

As shown in FIG. 11, the extension 34 of the rocker 32 can protrude through a cutout 56 in the adjusting element 44, so that the actuating element 36 can strike the extension 34 when wear is sensed. The adjusting element 44 also has an extension 58 pointing radially outward, on which the second spring element 42 can act, in order to move a ramp 60 of the adjusting element 44 on an opposing ramp 62 of the pressure plate 52. As shown in FIG. 12, the adjusting device 10 can be screwed to a leaf spring 66 through the elongated holes 48 by means of screws 64. The leaf spring 66 is riveted to a cover support 70 for attaching the clutch cover 50, using rivets 68. With the aid of the leaf spring 66, a transport position compensation can be achieved. The transport position compensation serves to compensate for the position of the adjusting device 10 in the transport location compared to the installed state of the friction clutch 38. This makes it possible to mount the adjusting device 10 on the clutch cover 50.

The leaf spring 66 has the advantage that it can fulfill both guiding the adjusting device 10 and supporting the adjusting device 10 on the clutch cover 50. The provided leaf spring 66 is riveted to the cover support 70 and screwed to the adjusting device 10. The screw connections make it possible to compensate for the shifting of the leaf spring 66 between the two installed positions in the elongated holes 48. That avoids bulging of the leaf springs 66. In the installed state, the force of the leaf springs operates against the clutch cover 50. During operation of the friction clutch 38, the adjusting device 10 undergoes an outward-directed force effect due to the active centripetal force. In order to brace this effect on the clutch cover 50 in the lower zone, tangentially projecting holding stops 72 are attached to the retainer 24. In the upper zone this task is assumed by the leaf springs. The retainer 24 together with the transport position compensation system braces the pre-tensioning and the adjusting force of the second spring element 42 against the clutch cover 50.

The preceding explanations and exemplary embodiments relate in particular to an adjusting device 10 for a friction clutch 38 of a motor vehicle, having a spindle 12, a spindle nut 14 screwed onto the spindle 12 to carry along an adjusting element 44 to adjust a wear-related incorrect gap between a counter plate 54 and a pressure plate 52 for pressing a clutch plate 40 between the pressure plate 52 and the counter plate 54, and an essentially frictionally engaged and/or essentially stepless means of swiveling for swiveling the spindle 12 to adjust the wear-related incorrect gap, as well as to a friction clutch having such an adjusting device 10.

Reference Labels 10 adjusting device
12 spindle
14 spindle nut
16 drum
18 sling rope
20 first end
22 first spring element
24 retainer
26 adjusting screw
28 second end
30 mounting bow
32 rocker 33 holding pin
34 extension
36 actuating element
38 friction clutch
40 clutch plate
42 second spring element
44 adjusting element
46 stop
48 elongated hole
50 clutch cover
52 pressure plate
54 counter plate
56 cutout
58 extension
60 ramp
62 opposing ramp
64 screw
66 leaf spring
68 rivet
70 cover support
72 holding stop

What is claimed is:

1. An adjusting device for a friction clutch (38) of a motor vehicle, having a spindle (12), a spindle nut (14) screwed onto the spindle (12) to carry along an adjusting element (44) to adjust a wear-related incorrect gap between a counter plate (54) and a pressure plate (52) for pressing a clutch plate (40) between the pressure plate (52) and the counter plate (54), a means of swiveling for swiveling the spindle (12) to adjust the wear-related incorrect gap, wherein:
   the means of swiveling has a sling rope (18) that is wrapped around a drum (16), which is connected to the spindle (12), and wherein the sling rope (18) is connected on a first end (20) to a first spring element (22); and,
   the means of swiveling is essentially frictionally engaged; or,
   the means of swiveling is essentially stepless.

2. The adjusting device recited in claim 1, wherein a spring element (42) proximate the spindle nut (14) is provided, to transmit an adjustment force from the spindle nut (14) to the adjusting element (44).

3. The adjusting device recited in claim 1, wherein the spindle (12) may be swiveled around a pivotal axis which runs eccentrically to the center axis of the spindle (12).

4. The adjusting device recited in claim 1, wherein the spindle (12) is supported in a rocker (32) that is rotatably connected to a retainer (24), where the rocker (32) is rotatable via a projecting extension (34) from an actuating element (36), the drum (16) being rotatable by the swiveling of the rocker (32).

5. The adjusting device recited in claim 1, wherein a spring force and a pre-tensioning of the first spring element (22), as well as a spring force and a pre-tensioning of the second spring element (42), are chosen so that when the drum (16) is rotated the sling rope (18) is non-positively, frictionally, joined to the drum (16), and when the pressure plate (52) is lifted off the counter plate (54) the sling rope (18) slips on the drum (16).

6. The adjusting device recited in claim 1, wherein the spindle (12) is received in a retainer (24) in particular to attach it to a clutch cover (50), the first end (20) of the sling rope (18) being connected through the first spring element (22) and a second end (28) of the spring rope being connected directly to the retainer (24).

7. A double plate friction clutch, for a motor vehicle, having a counter plate (54), a pressure plate (52) that is movable relative to the counter plate (54) to clamp a clutch plate (40) between the counter plate (54) and the pressure plate (52), a clutch cover (50) to at least partially cover the pressure plate (52), and an adjusting device (10), in particular connected to the clutch cover (52), said adjusting device (10) comprising a spindle (12), a spindle nut (14) screwed onto the spindle (12) to carry along an adjusting element (44) to adjust a wear-related incorrect gap between a counter plate (54) and a pressure plate (52) for pressing a clutch plate (40) between the pressure plate (52) and the counter plate (54), and a means of swiveling for swiveling the spindle (12) to adjust the wear-related incorrect gap, wherein:
   said adjusting device is operatively arranged to adjust a wear-related incorrect gap between the pressure plate (52) and the counter plate (54);
   the adjusting device (10) is connected through at least one elongated hole (48) to the clutch cover (50) or the pressure plate (52), while in a first end position of the elongated hole (48) actuation of the adjusting device (10) is disabled, and in a second end position of the elongated hole (48) actuation of the adjusting device (10) is enabled; and,
   the means of swiveling is essentially frictionally engaged; or,
   the means of swiveling is essentially stepless.

8. The friction clutch recited in claim 7, wherein the adjusting device (10) is situated radially outside of the pressure plate (52).

9. A friction clutch for a motor vehicle, comprising:
   a clutch plate;
   a counter plate;
   a pressure plate;
   an actuator arranged to move the pressure plate relative to the counter plate to clamp the clutch plate between the counter plate and the pressure plate; and,
   an adjusting device including:
      an adjustment element engaged with the pressure plate;
      a spindle;
      a spindle nut screwed onto the spindle;
      a drum connected to the spindle;
      first spring element urging the spindle and the drum in a first rotational direction with a first force; and,
      a second spring element engaged with the spindle nut and the adjustment element and applying a second force to the spindle nut in a first direction, wherein for an incorrect gap between the pressure plate and the clutch plate:
   the actuator is arranged to engage the adjusting device to rotate the drum and the spindle in a second rotational direction opposite the first rotational direction;
   the spindle is arranged to displace the spindle nut in a second direction opposite the first direction; and,
   when the actuator disengages from the adjusting device, the second spring element is arranged to displace the adjustment element to move the pressure plate.

* * * * *